United States Patent
Bozkurt

(10) Patent No.: US 9,321,111 B2
(45) Date of Patent: Apr. 26, 2016

(54) ROTATIONALLY DRIVEN MULTI-BEVEL STEP TOOL

(71) Applicant: GUEHRING OHG, Albstadt (DE)

(72) Inventor: Lutfi Bozkurt, Winterlingen (DE)

(73) Assignee: Guehring OHG, Albstadt (DE)

( * ) Notice: Subject to any disclaimer, the term of this patent is extended or adjusted under 35 U.S.C. 154(b) by 0 days.

(21) Appl. No.: 14/733,216

(22) Filed: Jun. 8, 2015

(65) Prior Publication Data

US 2015/0266106 A1 Sep. 24, 2015

Related U.S. Application Data

(63) Continuation of application No. 13/942,087, filed on Jul. 15, 2013, now abandoned, which is a continuation of application No. 13/248,469, filed on Sep. 29, 2011, now abandoned, which is a continuation of application No. PCT/DE2010/000366, filed on Mar. 30, 2010.

(30) Foreign Application Priority Data

Mar. 30, 2009 (DE) .......................... 10 2009 003 700

(51) Int. Cl.
    *B23B 51/00* (2006.01)
    *B23B 51/06* (2006.01)

(52) U.S. Cl.
    CPC .............. *B23B 51/009* (2013.01); *B23B 51/06* (2013.01); *B23B 2220/04* (2013.01);
    (Continued)

(58) Field of Classification Search
    CPC .............. B23B 2251/48; B23B 51/009; B23B 2270/30

USPC ......... 408/223, 224, 225, 226, 227, 228, 229, 408/222, 59
See application file for complete search history.

(56) References Cited

U.S. PATENT DOCUMENTS

| 26,613 | A | 12/1859 | Phelns |
| 222,101 | A | 11/1879 | Temple |

(Continued)

FOREIGN PATENT DOCUMENTS

| DE | 1 041 324 A | 10/1958 |
| DE | 17 85 012 U | 3/1959 |

(Continued)

OTHER PUBLICATIONS

International Search Report bearing a mailing date of Jul. 27, 2010 from a corresponding international patent application, 4 pages.

*Primary Examiner* — Eric A Gates
*Assistant Examiner* — Paul M Janeski
(74) *Attorney, Agent, or Firm* — Burr & Brown, PLLC

(57) ABSTRACT

A rotationally driven multi-bevel step tool comprises a plurality of single- or multi-edged cutting steps arranged in a staggered manner in a cutting and feeding direction, a number of flutes in each step corresponding to the number of cutting edges in each corresponding step, at least one web, and at least one swarf window. Flutes which are adjacent in the circumferential direction in each step are delimited from one another by at least one of the at least one web. The flutes which are adjacent in the circumferential direction, of two successive cutting steps, are connected to one another by at least one of the at least one swarf window, the at least one of the at least one swarf window penetrating the web located therebetween and being open on the circumferential side.

20 Claims, 4 Drawing Sheets

(52) U.S. Cl.
CPC ...... *B23B 2226/315* (2013.01); *B23B 2250/12* (2013.01); *B23B 2251/406* (2013.01); *Y10T 408/45* (2015.01); *Y10T 408/455* (2015.01); *Y10T 408/78* (2015.01); *Y10T 408/81* (2015.01); *Y10T 408/906* (2015.01); *Y10T 408/9095* (2015.01)

(56) References Cited

U.S. PATENT DOCUMENTS

| | | |
|---|---|---|
| 399,595 A | 3/1889 | Wyckoff |
| 550,190 A | 11/1895 | Myers |
| 716,557 A | 12/1902 | Klingensmith |
| 805,170 A | 11/1905 | Thomas |
| 877,592 A | 1/1908 | Perry et al. |
| 1,586,559 A | 6/1926 | Laursen |
| 1,747,117 A | 2/1930 | Klein |
| 5,176,477 A | 1/1993 | Noggle |
| 5,509,761 A | 4/1996 | Grossman et al. |
| 7,513,319 B2 | 4/2009 | DeVall |
| 8,430,608 B2 | 4/2013 | Sugano et al. |
| 2009/0028654 A1 | 1/2009 | Turrini |
| 2010/0254777 A1 | 10/2010 | Schäfer |

FOREIGN PATENT DOCUMENTS

| | | |
|---|---|---|
| DE | 36 10 016 A1 | 10/1987 |
| DE | 299 01 414 U1 | 9/1999 |
| DE | 200 15 550 U1 | 11/2000 |
| DE | 20 2007 015 595 U1 | 1/2008 |

ROTATIONALLY DRIVEN MULTI-BEVEL STEP TOOL

CROSS REFERENCE TO RELATED APPLICATIONS

This application is a continuation of U.S. patent application Ser. No. 13/942,087, filed Jul. 15, 2013, which is a continuation of U.S. patent application Ser. No. 13/248,469, filed Sep. 29, 2011, the entirety of which is incorporated herein by reference as if set forth in its entirety.

U.S. patent application Ser. No. 13/248,469, filed Sep. 29, 2011, is a continuation of International Application Serial No. PCT/DE2010/000366, filed Mar. 30, 2010, the entirety of which is incorporated herein by reference as if set forth in its entirety.

The invention relates to a rotationally driven step tool, in particular a step drill for drilling into solid material, with a plurality of in each case single- or multi-edged cutting steps arranged in a staggered manner in a cutting and feed direction.

Machining operations, which are multi-step, often occur in production technology. So, it is for example a matter of producing axially staggered bores of various diameters, but often also bores with countersinks or combinations of various holes and countersinks. In order to keep the machining times as low as possible, combination tools were developed in order to produce the previously mentioned various machining operations in one work step. Combination tools of this type include step drills, countersinks, step countersinks, step reamers, etc., which are generally designated—where expedient—as step tools in the following.

Examples for step tools of this type are found in the published documents DE 299 01 414 U1, DE 36 10 016 A1, DE 200 15 550 U1, DE 20 2007 015 595 U1, DE 1785012 U or DE 1 041 324 A. In the case of the step tools described in DE 299 01 414 U1, DE 36 10 016 A1 and DE 200 15 550 U1, the swarf created in each case in a plurality of cutting steps is conducted away via common flutes. The step tool described in DE 20 2007015595 U1 has two cutting steps with their own flutes in each case. The step drill described in DE 1 041 324 A is virtually a combination of the two previously mentioned step tools, in which three flutes are assigned in each case to a first, third and fifth cutting step and a second and fourth cutting step. DE 1 785 012 A shows and describes a generic multi-step tool in the form of a multi-bevel step drill with two cutting steps of various machining diameters, each cutting step being assigned its own flutes.

Conventional multi-bevel step tools have the disadvantage that under unfavourable conditions, a swarf jam can occur easily in the region of a cutting step with relatively small machining diameter due to the fact that the volume available for conducting away swarf for each flute is for the most part of small dimensions. The risk of a swarf jam increases for example with the axial length of a cutting step with small machining diameter.

Starting from a multi-bevel step tool, as is known in DE 1 785 012 A, the invention is based on the object of developing a multi-bevel step tool in such a manner that reliable conduction away of swarf is ensured, particularly in the region of a cutting step with a relatively small machining diameter.

The object is achieved by means of a multi-bevel step tool comprising a plurality of single- or multi-edged cutting steps arranged in a staggered manner in a cutting and feeding direction, a number of flutes in each step corresponding to the number of cutting edges in each corresponding step, at least one web, and at least one swarf window, flutes which are adjacent in the circumferential direction in each step delimited from one another by at least one of the at least one web, the flutes which are adjacent in the circumferential direction, of two successive cutting steps, connected to one another by at least one of the at least one swarf window, the at least one of the at least one swarf window penetrating the web located therebetween and being open on the circumferential side.

The rotationally driven multi-bevel step tool according to the invention has a plurality of in each case single- or multi-edged cutting steps arranged in a staggered manner in the (circumferential or rotational) cutting and (axial or) feed direction with a number of flutes corresponding to the number of cutting edges in each case. In the case of single-edged cutting steps, the cutting steps therefore have precisely one cutting edge in each case as well as a flute assigned to the cutting edge, whilst in the case of double-, triple-, etc. -edged cutting steps, the cutting steps have a corresponding number of cutting edges as well as a number of flutes corresponding to the number of cutting edges, which flutes are assigned to one cutting edge in each case. Each cutting step therefore has a number of flutes corresponding to the number of the cutting edges present in each case. Flutes which are adjacent in the circumferential direction are delimited from one another in each case by means of a web. The flutes and therefore also the webs lying therebetween can run helically or linearly in relation to the rotational axis of the multi-bevel step tool.

In the case of two cutting steps, in the cutting and feed direction, the staggering of the cutting steps, which have various machining diameters, provides a first or leading cutting step in the cutting and feed direction with a smaller machining diameter and a second or trailing cutting step in the cutting and feed direction with a larger machining diameter. In the case of more than two cutting steps, in each case two successive cutting steps in the cutting and feed direction are formed, made up of a leading cutting step in the cutting and feed direction and a trailing cutting step in the cutting and feed direction, for example the first cutting step and the second cutting step or the second cutting step and the third cutting step, etc. A leading cutting step always has a smaller machining diameter than a trailing cutting step.

As mentioned above, in the case of the multi-bevel step tool according to the invention, flutes, which are adjacent in the circumferential direction, of two cutting steps, which follow one another in the cutting and feed direction, are in each case delimited from one another by a web. In spite of their assignment to various cutting steps, the flutes are preferably constructed continuously from the start of the respective cutting step to the outlet at the tool shank, so the flutes of a leading cutting step are longer than the flutes of a trailing cutting step, as long as the flutes run out at the same point in the axial direction.

According to the invention, the flutes, which are adjacent in the circumferential direction, of two cutting steps, which follow one another in the cutting and feed direction, i.e. a leading cutting step with a smaller machining diameter and a trailing cutting step with a larger machining diameter, are connected via a swarf window which penetrates the web lying therebetween and is open on the circumferential side. With respect to the leading cutting step, the swarf window is therefore located either in the respectively assigned milling face of the leading cutting step or else, in case the multi-bevel step tool is formed from a support body equipped with cutting plates, in the face of the flute of the leading cutting step which extends the respectively assigned milling face.

The cutting steps, which follow one another in the cutting and feed directions and the flutes of which are adjacent in the circumferential direction and are in each case connected by a swarf window, are preferably the first and second cutting step, as problems conducting away the swarf have more of a tendency to occur in the region of the first cutting step which has the smallest machining diameter. Alternatively or additionally to the first and second cutting steps, flutes, which are adjacent in the circumferential direction, of the second and third steps, the third and fourth steps, etc., i.e. any two cutting steps which follow one another in the cutting and feed direction, can also be connected by a swarf window in the web located therebetween, however.

In each case, at least a portion of the swarf which is conducted away in the flute of a leading cutting step in the cutting and feed direction with a smaller machining diameter can escape via the swarf window, which is produced e.g. by milling out or grinding out, into the flute, which is adjacent in the circumferential direction, of a trailing cutting step in the cutting and feed direction with a larger machining diameter. The conducting away of the swarf produced in the leading cutting step therefore takes place in the direction of extension of the flutes until the swarf window is reached only via the respective flute of the leading cutting step and from the reaching of the swarf window both in the respective flute of the leading cutting step and in the flute of the trailing cutting step, which is adjacent in the circumferential direction. Therefore, overall an enlarged volume is available for conducting away swarf created in a leading cutting step, as a result of which an improved conduction away of swarf can be achieved, especially in the case of a very small machining diameter of a leading cutting step. Thanks to the improved conduction away of swarf, if appropriate, the radial depth of the flute(s) of the leading cutting step can be dimensioned narrowly, in order, e.g. to obtain a large core diameter.

The multi-bevel step tool is used in particular in the form of a multi-bevel step drill for producing injector bores in a cylinder head. The individual cutting steps, for example three cutting steps, are preferably constructed in a multi-edged manner in each case with front and circumferential cutting edges equidistantly arranged in the circumferential direction, particularly in a double-edged manner with front and circumferential cutting edges arranged point-symmetrically.

Further advantageous developments are the subject matter of dependent claims.

In a preferred development, the swarf window extends in the radial direction essentially as far as the base of the flute, which is adjacent in the circumferential direction, of the trailing cutting step. The swarf window therefore has a satisfactory radial depth which means that the swarf produced in the leading cutting step can pass over into the flute, which is adjacent in the circumferential direction, of the trailing cutting step and can there be forwarded in the direction of the tool shank.

The swarf window is preferably arranged in such a manner in the feed direction that it encompasses at least the start of the trailing cutting edge, in particular in such a manner that an assigned front cutting edge of the trailing cutting step is essentially located centrally in the swarf window. With this position, it is ensured the maximum length of the flute of the trailing cutting step is available for the further transporting of the swarf created in the leading cutting step. The swarf escaping from the flute of the leading cutting step via the swarf window into the flute, which is adjacent in the circumferential direction, of the trailing cutting step is therefore conducted from the start of the trailing cutting step together with the swarf produced in the trailing cutting step in the direction of the tool shank.

The radial depth and also the axial length, i.e. the size of the swarf window can be determined as a function of the material to be machined and/or the average size (length, thickness, width) of the swarf to be expected in the leading cutting step. Actually, this means that in the case of relatively long swarf, a deeper longer swarf window can be provided, whilst in the case of relatively short swarf, a flatter shorter swarf window may be sufficient. By means of a shaping of the swarf window which takes account of the respective production conditions, the passing over of the swarf from the flute of the leading cutting step into the flute, which is adjacent in the circumferential direction, of the trailing cutting step can be improved.

The swarf window is divided in the axial direction of the tool tip in the direction of the tool shank preferably into a swarf window inlet of increasing radial depth, a swarf window base, which is adjacent to the swarf window inlet and preferably runs axially parallel, and a swarf window outlet of decreasing radial depth, which is adjacent to the swarf window base. The length of the preferably axially parallel running swarf window base can be determined in accordance with the respective requirements. For example, the swarf window base can be dimensioned in a very short manner, as a result of which the swarf window has the shape of a concave recess when observed from the side. By means of a longer dimensioning of the swarf window base, the swarf window can have an elongated shape. The swarf window inlet and the swarf window outlet are preferably in each case constructed as concavely curved surfaces. The swarf window base is preferably formed from a planar surface of predetermined axial length or from a for example concavely curved surface of predetermined axial length.

The swarf window base is preferably inclined by an predetermined angle with respect to the milling face or a flute face, which extends the milling face of the trailing cutting step, of the flute, which is adjacent in the circumferential direction. By means of the inclination of the swarf window base with respect to the milling face or a flute face, which extends the milling face, of the flute, which is adjacent in the circumferential direction, of the trailing cutting step, the difference in the radial depth between the flute of the leading cutting step and the flute of the trailing cutting step can be gradually reduced, as a result of which the spilling over of the swarf from the flute of the leading cutting step into the flute, which is adjacent in the circumferential direction, of the trailing cutting step is improved.

Further, the swarf window can be orientated in the direction of the opening through the web located between the flutes which are adjacent in the circumferential direction essentially radially with respect to the rotational axis of the multi-bevel step tool or with respect to the direction of longitudinal extent of the two flutes or else at an angle smaller than 90° relative to the rotational axis of the multi-bevel step tool or relative to the direction of longitudinal extent of the flute of the respectively trailing cutting step. The orientation of the swarf window at an angle smaller than 90° relative to the rotational axis or direction of longitudinal extent of the flute is advantageous compared to an essentially radial orientation to the extent that the swarf is deflected to a lesser extent through the swarf window from the flute of the leading cutting step into the flute, which is adjacent in the circumferential direction, of the trailing cutting step, as a result of which the conducting away of swarf is improved overall.

In a preferred development, the multi-bevel step tool according to the invention has an integrally constructed support body made from solid carbide and PCD (polycrystalline diamond) cutting plates arranged on the support body. In this development, the swarf window of the leading cutting step is adapted with respect to axial length and axial position to the axial length and axial position of an assigned cutting plate of the trailing cutting step.

The flutes can be spirally constructed, preferably they are linearly constructed however.

The multi-bevel step tool according to the invention further preferably has an internally located channel system designed for minimum quantity lubrication for providing one or a plurality of cutting steps with coolant/lubricant. The coolant/lubricant supply in this case preferably takes place via discharge openings which are in each case located in the region of a front open area, i.e. in the cutting direction behind an assigned front cutting edge of the leading cutting step. In the case of a multi-bevel step tool with a plurality of cutting steps, it may be satisfactory if only certain cutting step(s), for example in the case of three cutting steps only the first and second cutting steps, the swarf of which must be conducted away over a relatively long path in the direction of the tool shank, are provided with lubricant. In each case, the lubricant leaving at the front in the region of the open area can flow away via the flute, which is adjacent in the circumferential direction, of the trailing cutting step in the cutting direction and thereby support the conducting away of swarf in the trailing cutting step.

In the following, an exemplary embodiment of a multi-bevel step tool according to the invention is explained on the basis of drawings. In the figures:

FIG. 1b shows a frontal view of the step drill from FIG. 1a;

FIG. 2a shows a side view of the step drill rotated through −40° about the rotational axis compared to the side view according to FIG. 1a;

FIG. 3a shows a side view of the step drill rotated through −70° about the rotational axis compared to the side view according to FIG. 1a;

FIG. 3c shows a view on an enlarged scale of the tool tip of the step drill from FIG. 3a.

Figure 1B:
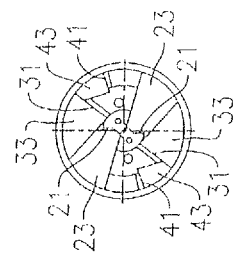

In the figures, a multi-edged, machining and rotationally driven multi-bevel step tool in the form of a step drill is specified with the reference number 10. The step drill 10 is used for producing stepped bores, as are required for example as injector bores in cylinder blocks in automotive technology for accommodating fuel injectors. It is pointed out that the dimension and machining information contained in the figures relates to just one exemplary embodiment of a multi-bevel step tool.

The step tool 10 has a tool shank 12 for clamping in a chuck (not shown) and a cutting part 14. The step drill 10 for example has a length of approx. 191.5 mm and a tool shank diameter of approx. 25 mm. In the exemplary embodiment shown, the step drill 10 has three cutting steps 20, 30 and 40, the first cutting step 20 having a nominal diameter D20, the second cutting step 30 having a somewhat larger nominal diameter D30 and the third cutting step 40 having an in turn larger nominal diameter D40.

The dimension D20 is for example approximately 7.7 mm, the dimension D30 is approximately 18 mm and the dimension D40 is approximately 23.7 mm. All of the nominal diameters are of exceptionally narrow tolerance. The first, second and third cutting steps 20, 30, 40 are, as can be seen from the figures, arranged in a staggered manner in the cutting and feed direction, specifically in such a manner that the angular spacing between the first and the second cutting steps is approximately −40° and the angular spacing between the first and the third cutting steps is approximately −70°. In the FIGS. 1a, 2a, the start of the second and third cutting steps 30, 40 is in each case indicated by means of dashed lines.

Figure 2B:
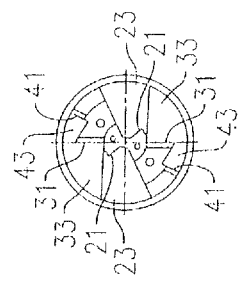
FIG. 2b shows a frontal view of the step drill rotated through −40° about the rotational axis compared to the frontal view according to FIG. 1b

The first, second and third cutting steps 20, 30, 40 are double-edged in each case in the exemplary embodiment shown, i.e. constructed with two front cutting edges 21, 31, 41 and two circumferential cutting edges 22, 32, 42 in each case, as well as with two flutes 23, 33, 43 in accordance with the number of cutting edges in each case (cf. FIG. 1b, FIG. 2b). The flutes 23, 33, 43 are, as can be seen from the figures, in each case constructed continuously and linearly from the start of the respective cutting step 20, 30, 40 to the outlet thereof shortly upstream of the tool shank 12. Flutes 23, 33 or 33, 43 adjacent in the circumferential direction are delimited from one another in each case by means of a web 24, 34, 44. Due to the staggering of the first, second and third cutting steps 20, 30, 40 in the cutting and feed direction, as can be seen from the figures, the first cutting step 20 forms a leading cutting step in the cutting and feed direction with respect to the second cutting step 30, whilst the second cutting step 30 forms a trailing cutting step in the cutting and feed direction with respect to the first cutting step 20 and also forms a leading cutting step with respect to the third cutting step 40. The third cutting step 40 in turn forms a trailing cutting step in the cutting and feed direction with respect to the second cutting step 30.

Figure 3B:
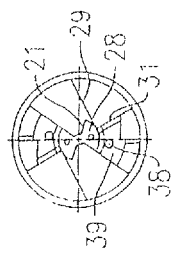
FIG. 3b shows a frontal view of the step drill rotated through −70° about the rotational axis compared to the frontal view according to FIG. 1b.
Figure 3A:
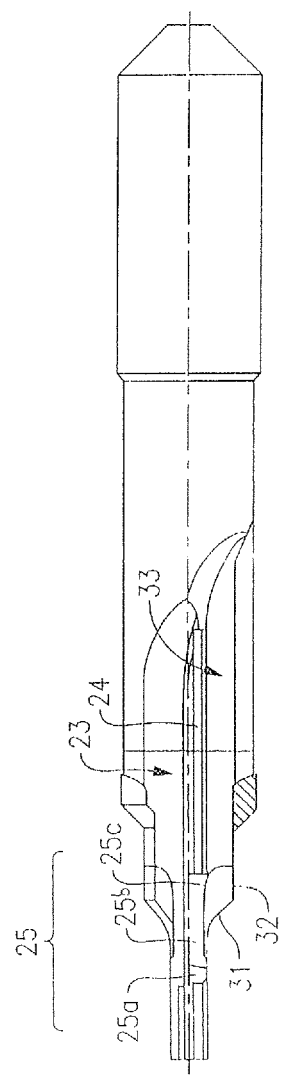
Figure 3C:
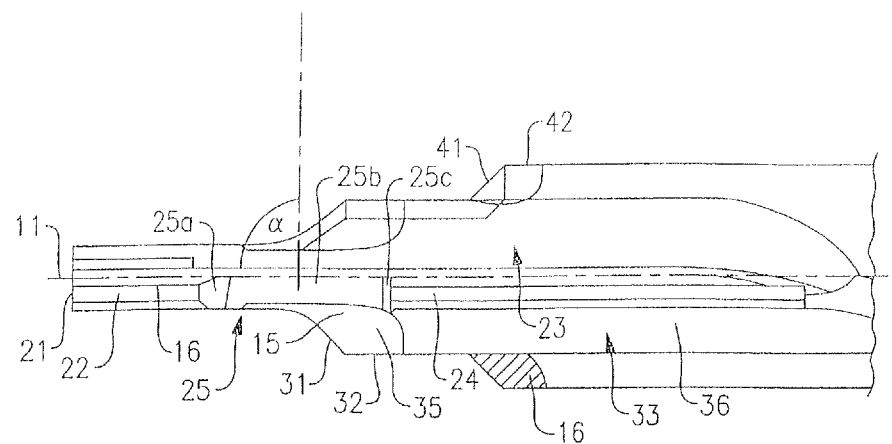
Figure 4:
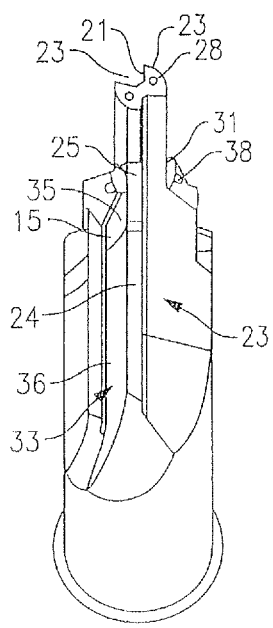
FIG. 4 shows a perspective illustration of the step drill according to the FIGS. 1a to 3c.

In the exemplary embodiment shown, the step drill 10 has an integrally constructed support body made from solid carbide and PCD (polycrystalline diamond) cutting plates 14, 15, 16 arranged on the support body, which in each case form a front and a circumferential cutting edge 21, 22, 31, 32 or 41, 42 (cf. FIG. 3c).

In the exemplary embodiment shown in the figures, the flutes 23, 33, which are adjacent in the circumferential direction, of the first and second cutting steps 20, 30 are connected to one another by means of a swarf window 25 which penetrates the web 24 located therebetween and is open on the circumferential side. In the exemplary embodiment shown, the swarf window 25 which penetrates the web 24 extends in the radial direction essentially as far as the base of the flute 33, which is adjacent in the circumferential direction, of the trailing second cutting step 30. The swarf window 25 extends in the feed direction as far as the start of the second cutting step 30, specifically essentially so far that the closest front cutting edge 31 of the second cutting step 30 is located essentially centrally in the swarf window 25 (cf. FIG. 2a).

The swarf window 25 is divided in the axial direction of the tool tip 11 in the direction of the tool shank 12 into a swarf window inlet 25a of increasing radial depth, a swarf window base 25b, which is adjacent to the swarf window inlet 25a and runs axially parallel, and a swarf window outlet 25c of decreasing radial depth, which is adjacent to the swarf window base 25b (cf. FIGS. 3a, 3c). In the exemplary embodiment shown, the swarf window inlet 25a and the swarf window outlet 25c with the swarf window base 25b located therebetween construct a swarf window in such a manner that the swarf window 25 is essentially radially oriented in the direction of the opening through the web 24 relative to the rotational axis 11 of the step drill or relative to the direction of longitudinal extent of the flute 33 of the second cutting step 30 (cf. in FIG. 3c: $\alpha \approx 90°$).

In the exemplary embodiment shown, the length of the axially parallel running swarf window base 25b essentially corresponds to the length of the PCD cutting plate 15 which forms the front and circumferential cutting edges 31, 32 of the second cutting step 30. The swarf window inlet 25a and the swarf window outlet 25b are in each case constructed as concavely curved surfaces. In the exemplary embodiment shown, the swarf window base 25b is formed from a planar surface of predetermined axial length. Furthermore, the swarf window base 25b is inclined by an predetermined angle, of approximately 5° in the exemplary embodiment shown, with respect to a flute face 36, which extends the milling face 35 of the second cutting step 30, of the flute 33.

Figure 1A:
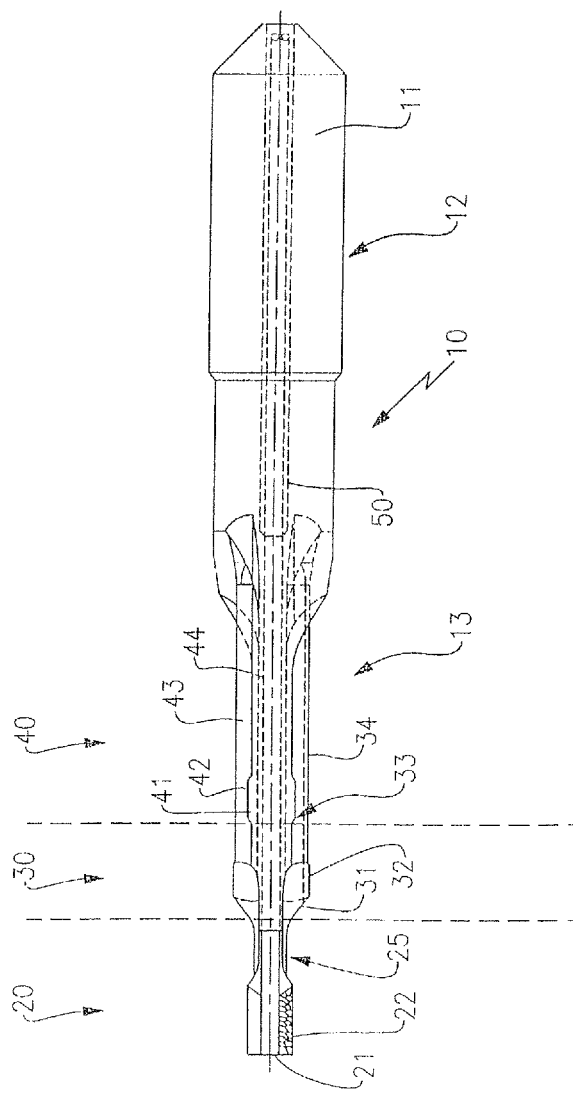
FIG. 1a shows a side view of an embodiment of a multi-edged step drill.
Figure 2A:
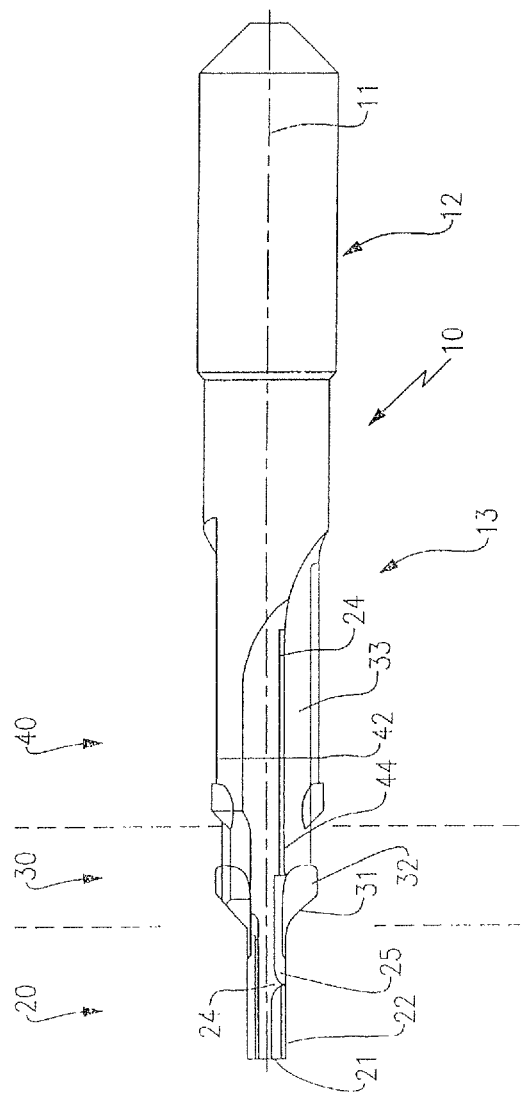

The tool 10 has a coolant/lubricant supply of the first and second cutting steps 20, 30 by means of an internally located channel system 50 designed for minimum quantity lubrication, which is indicated dashed in FIG. 1a. The coolant/lubricant supply takes place via discharge openings 28, 38 which are in each case located in the region of a front open area 29, 39, i.e. in the cutting direction behind an assigned front cutting edge 21, 31 of the first or second cutting step 20, 30.

Of course, deviations from the described exemplary embodiments are possible without abandoning the basic ideas of the invention.

Thus, in the exemplary embodiment shown, swarf windows can be provided not only between the flutes 23, 33, which are adjacent in the circumferential direction, of the first and second cutting steps 20, 30, but also between the flutes, which are adjacent in the circumferential direction, of the second and third cutting steps 30, 40.

Instead of three cutting steps, a multi-bevel step tool according to the invention can have just two, or else more than three cutting steps. If more than three cutting steps are present, any flutes, which are adjacent in the circumferential direction, of a leading and trailing cutting step in the cutting and feed direction are connected to one another by means of a swarf window which penetrates the web located therebetween.

In deviation from the exemplary embodiment shown, in which the swarf window 25 is essentially orientated radially to the rotational axis 11 or to the direction of longitudinal extent of the flutes of the trailing cutting step in each case, the swarf window inlet 25a and the swarf window outlet 25c with the swarf window base 25b located therebetween can also be constructed in such a manner that the swarf window 25 is orientated at an angle $\alpha<90°$ relative to the rotational axis 11 or to the direction of longitudinal extent of the flutes of the trailing cutting step in each case.

The various cutting steps can be constructed in a single-edged manner in each case, in deviation from the exemplary embodiment shown or else have more than two cutting edges.

Furthermore, instead of a few selected cutting steps, all cutting steps can also be supplied with coolant/lubricant.

The invention claimed is:

1. A rotationally driven multi-bevel step tool comprising:
    a plurality of single- or multi-edged cutting steps arranged in a staggered manner in a cutting and feeding direction of the multi-bevel step tool;
    a number of flutes in each step corresponding to the number of cutting edges in each corresponding step;
    at least one web, flutes which are adjacent in the circumferential direction, in each step, delimited from one another by at least one of said at least one web; and
    at least one swarf window, the flutes which are adjacent in the circumferential direction, of two successive cutting steps, connected to one another by at least one of said at least one swarf window, said at least one of said at least one swarf window penetrating the web between the two successive cutting steps, the swarf window being open on the circumferential side.

2. The multi-bevel step tool according to claim 1, wherein the swarf window extends in the radial direction essentially as far as a base of the flute of a trailing cutting step.

3. The multi-bevel step tool according to claim 1, wherein the multi-bevel step tool comprises a tool shank and the swarf window extends in the axial direction towards the tool shank at least as far as a start of a trailing cutting step.

4. The multi-bevel step tool according to claim 3, wherein the swarf window extends in the axial direction towards the tool shank to such an extent that a closest front cutting edge of the trailing cutting step is located essentially centrally in the swarf window.

5. The multi-bevel step tool according to claim 3, wherein the swarf window has a predetermined axial length which is determined as a function of the swarf size of the swarf produced in the leading cutting step.

6. The multi-bevel step tool according to claim 1, wherein the swarf window is divided in the axial direction in the direction towards the tool shank into a swarf window inlet of increasing radial depth, a swarf window base, which is adjacent to the swarf window inlet and preferably runs axially parallel, and a swarf window outlet of decreasing radial depth, which is adjacent to the swarf window base.

7. The multi-bevel step tool according to claim 6, wherein the swarf window base is formed from a planar surface.

8. The multi-bevel step tool according to claim 6, wherein the swarf window base is preferably inclined by an predetermined angle with respect to the milling face or a flute face, which extends the milling face, of the flute, which is adjacent in the circumferential direction, of the trailing cutting step.

9. The multi-bevel step tool according to claim 6, wherein the swarf window inlet and the swarf window outlet are in each case constructed as concavely curved surfaces.

10. The multi-bevel step tool according to claim 1, wherein the swarf window comprises an inlet that opens to a radial depth at a predetermined angle through the web located between the flutes which are adjacent in the circumferential direction, said predetermined angle no greater than 90 degrees relative to the rotational axis of the multi-bevel step tool or relative to the direction of longitudinal extent of the flutes.

11. The multi-bevel step tool according to claim 1, wherein the multi-bevel step tool comprises an integrally constructed support body made from solid carbide and wherein the cutting edge(s) of the cutting steps are formed by PCD (polycrystalline diamond) cutting plates arranged on the support body.

12. The multi-bevel step tool according to claim 11, wherein the swarf window corresponds with respect to axial length and axial position to the axial length and axial position of a closest cutting plate of the trailing cutting step.

13. The multi-bevel step tool according to claim 1, wherein the flutes are constructed linearly.

14. The multi-bevel step tool according to claim 1, wherein the multi-bevel step tool comprises an internally located channel system designed for minimum quantity lubrication for supplying the multi-bevel step tool with fluid.

15. The multi-bevel step tool according to claim 14, wherein the fluid supply of one or a plurality of cutting steps takes place via discharge openings which are in each case located in a front open area behind an assigned front cutting edge.

16. The multi-bevel step tool according to claim 1, wherein the cutting steps are constructed in a multi-edged manner in each case with front and circumferential cutting edges equidistantly arranged in the circumferential direction, particularly in a double-edged manner with front and circumferential cutting edges arranged point-symmetrically.

17. The multi-bevel step tool according to claim 1, wherein the swarf window runs axially parallel.

18. The multi-bevel step tool according to claim 1, wherein a solid portion of the tool extends longitudinally through the swarf window.

19. The multi-bevel step tool according to claim 1, wherein the swarf window successively connects the flutes of no more than two cutting steps.

20. The multi-bevel step tool according to claim 1, wherein the swarf window extends around less than a circumference of the tool.

* * * * *